Sept. 26, 1933.   C. T. WALLIS ET AL   1,928,403
SHAFT BEARING
Filed April 26, 1929

Inventors
Cyril T. Wallis
Norman O. Marquart
by their attorney
Farnum F. Dorsey

Patented Sept. 26, 1933

1,928,403

UNITED STATES PATENT OFFICE 1,928,403

SHAFT BEARING

Cyril T. Wallis and Norman O. Marquart, Rochester, N. Y., assignors, by mesne assignments, to North East Appliance Corporation, Rochester, N. Y., a corporation of New York Application April 26, 1929. Serial No. 358,357

5 Claims. (Cl. 308—163)

This invention relates to a bearing construction for retaining a shaft against longitudinal movement in its journal bearing, and for lubricating the members by which the thrust in the shaft is sustained. The invention is particularly applicable to the drive shaft of a tachometer or similar small instrument or machine, particularly where the shaft is journalled in a stationary member or body formed by die casting.

One object of the invention is to provide a bearing construction which shall be simple and inexpensive, and capable of ready assembly or disassembly. Another object is to provide, in a simple manner, for the application of lubricant to the thrust-bearing surfaces. To the foregoing ends the invention consists in the bearing construction hereinafter described, and illustrated in the accompanying drawing, as the same is defined in the appended claims.

Figure 1:
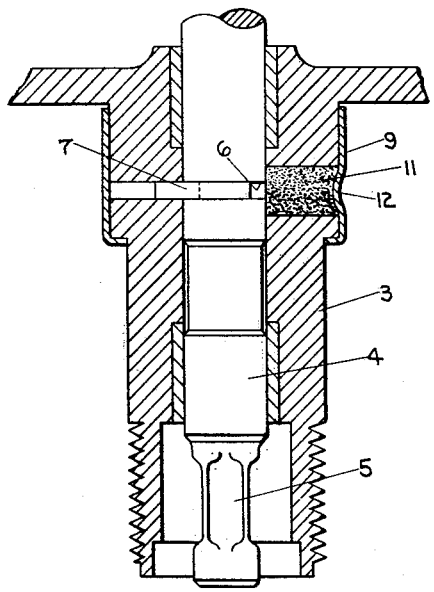
Figure 2:
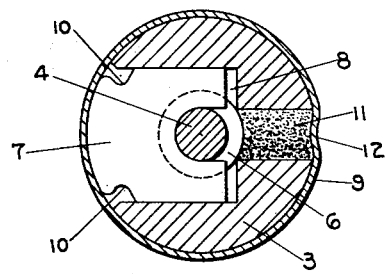

In the accompanying drawing Fig. 1 is a longitudinal sectional view of a bearing construction embodying the present invention, and Fig. 2 is a transverse section in the plane of the thrust key.

The invention is illustrated as embodied in the shaft bearing of a tachometer or similar instrument, but it will be understood that it is not limited to such use. In the illustrated embodiment a stationary body 3, in the form of a cylindrical stem, is provided with an axial bore in which a drive shaft 4 is journalled. One end, 5, of this shaft is specially formed to cooperate with a flexible shaft by which the instrument is driven in the usual manner.

To retain the shaft against longitudinal movement it is provided with an annular groove 6, which furnishes two bearing surfaces for sustaining thrust. Cooperating with this groove is a member 7, hereinafter described as a "thrust key." This member comprises a metal plate having a U-shaped recess at its inner end, as shown in Fig. 2. This end of the thrust key is seated in the groove 6 and the thickness of the plate is such that it substantially fills the groove. The thrust key is seated in a lateral opening or socket 8, formed in the body 3, the dimensions of this socket being such that the key is closely embraced so as to prevent unnecessary looseness in the direction of the thrust.

To retain the thrust key in operative position the body 3 is surrounded by a sleeve 9, which may conveniently be drawn from sheet metal. This sleeve covers the outer end of the socket 8, and retains the key against endwise movement. In order that the key may be withdrawn when necessary it is provided with notches 10, at its outer end, for the reception of an appropriate instrument.

In order that lubricant may be supplied, as necessary, to the thrust-bearing surfaces of the shaft and the key, the body 3 is provided with a second lateral opening, opposite the opening 8, and in this opening is seated a wick 11, which may be saturated with oil or grease. The inner end of the wick engages the shaft laterally, adjacent to the two bearing surfaces formed by the groove, and thus supplies the lubricant as nearly as possible at the required points. This wick is also covered and retained in place by the sleeve 9.

In order to secure the sleeve 9 yieldingly in place it is preferably provided with a slight depression 12, which springs into the outer end of the opening in which the wick 11 is seated.

When the shaft is to be withdrawn for any reason, it may be released by removing the sleeve 9 and withdrawing the thrust key, and when it is replaced it may be as readily secured by replacing the thrust key and the sleeve.

The invention claimed is:

1. The combination of a shaft provided with an annular thrust-bearing surface, a stationary body having a bore, in which said shaft is journalled, and lateral openings meeting said bore at the plane of said thrust-bearing surface, a thrust key seated in one of said openings and cooperating with said surface, an oiling device seated in another of said openings and engaging the shaft adjacent said surface, and a sleeve surrounding said body, covering said openings and retaining said key and said oiling device in place.

2. The combination of a shaft provided with an annular groove, a stationary body having a bore in which said shaft is journalled, lateral openings in said body meeting said bore at the plane of said groove, a thrust key seated in one of said openings and engaging within said groove in the shaft so as to act in both directions as a thrust bearing for the shaft, an oiling device seated in another of said openings and engaging the shaft adjacent said groove, and a sleeve surrounding said body, covering said openings and retaining said key and said oiling device in place.

3. The combination of a shaft provided with an annular thrust-bearing surface, a stationary body having a bore in which said shaft is journalled, lateral openings meeting said bore at the plane of said thrust-bearing surface, a thrust key seated in one of said openings and cooperating with said surface, an oiling device seated in another of said openings and engaging the shaft adjacent said surface, and a sleeve surrounding said body and frictionally engaged therewith, covering said openings and retaining said key and said oiling device in place, said sleeve being formed with a depression which extends slightly within one of said openings to prevent accidental displacement of said sleeve from said body.

4. The combination of a shaft provided with an annular thrust-bearing surface, a stationary body having a bore in which said shaft is journalled, lateral openings on opposite sides of said body opening into said bore adjacent said thrust-bearing surface on the shaft, a thrust element in one of said openings engaging said surface, a means in the other opening to lubricate said surface, and a single means engaging said body and covering said openings to thereby retain said thrust element and lubricating means in place.

5. The combination with a shaft and a body into which said shaft extends, of lateral openings in said body to receive a thrust key for said shaft and a lubricating means, and a retaining sleeve for said thrust key and lubricating means frictionally engaged with said body having a depression extending within one of said openings to prevent accidental displacement thereof.

CYRIL T. WALLIS.
NORMAN O. MARQUART.